(12) United States Patent
Bhattad et al.

(10) Patent No.: US 11,606,175 B2
(45) Date of Patent: Mar. 14, 2023

(54) ENHANCEMENT OF PHYSICAL UPLINK CONTROL CHANNEL (PUCCH) FORMAT

(71) Applicant: QUALCOMM Incorporated, San Diego, CA (US)

(72) Inventors: Kapil Bhattad, Bangalore (IN); Tanumay Datta, Bangalore (IN); Ananta Narayanan Thyagarajan, Bangalore (IN); Jing Sun, San Diego, CA (US); Xiaoxia Zhang, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 16/926,547

(22) Filed: Jul. 10, 2020

(65) Prior Publication Data

US 2021/0014020 A1 Jan. 14, 2021

(30) Foreign Application Priority Data

Jul. 13, 2019 (IN) .............................. 201941028190

(51) Int. Cl.
*H04L 5/00* (2006.01)
*H04W 72/12* (2023.01)
*H04L 27/26* (2006.01)

(52) U.S. Cl.
CPC .......... *H04L 5/0046* (2013.01); *H04L 5/0007* (2013.01); *H04L 27/2604* (2013.01); *H04W 72/1284* (2013.01)

(58) Field of Classification Search
None
See application file for complete search history.

(56) References Cited

U.S. PATENT DOCUMENTS

| 11,191,062 | B2 * | 11/2021 | Takeda ................ H04L 27/2602 |
| 2016/0174214 | A1 | 6/2016 | Yerramalli et al. |

(Continued)

FOREIGN PATENT DOCUMENTS

| EP | 3512277 A1 | 7/2019 |
| EP | 3605933 A1 | 2/2020 |

(Continued)

OTHER PUBLICATIONS

Huawei, et al., "UL Channels and Signals in NR Unlicensed Band", 3GPP Draft, R1-1906043, 3GPP TSG RAN WG1 Meeting #97, 3rd Generation Partnership Project (3GPP), Mobile Competence Centre, 650, Route Des Lucioles, F-06921 Sophia-Antipolis Cedex, France vol. RAN WG1, No. Reno, USA, May 13, 2019-May 17, 2019, May 13, 2019 (May 13, 2019), XP051727500, 16 Pages, Retrieved from the Internet: URL: http://www.3gpp.org/ftp/Meetings%5F3GPP%5FSYNC/RAN1/Docs/R1%2D1906043%2Ezip [retrieved on May 13, 2019] Section 3.2.2.

(Continued)

*Primary Examiner* — Ajit Patel
(74) *Attorney, Agent, or Firm* — Patterson & Sheridan, LLP

(57) ABSTRACT

Certain aspects of the present disclosure provide techniques for enhanced physical uplink control channel (PUCCH) transmission. In some cases, a UE obtains payload bits to be conveyed in a physical uplink control channel (PUCCH) transmission via an interlace of resource blocks (RBs), determines a group of the RBs available to the UE, and transmits the payload bits using the determined group of RBs, wherein the transmitting involves modulating different RBs of the group by at least one of different payload bits or sequences.

34 Claims, 12 Drawing Sheets

(56) References Cited

U.S. PATENT DOCUMENTS

| | | | | |
|---|---|---|---|---|
| 2017/0374656 A1* | 12/2017 | Kim | ................ | H04W 72/0413 |
| 2018/0198569 A1* | 7/2018 | Lyu | ...................... | H04L 1/1812 |
| 2018/0279295 A1* | 9/2018 | Gao | ................ | H04W 72/0446 |
| 2019/0230648 A1* | 7/2019 | Kim | ...................... | H04L 1/0067 |
| 2020/0077424 A1* | 3/2020 | Baldemair | ........ | H04W 72/0453 |
| 2020/0267718 A1* | 8/2020 | Park | ........................ | H04L 5/06 |

FOREIGN PATENT DOCUMENTS

| | | |
|---|---|---|
| WO | 2018047886 A1 | 3/2018 |
| WO | 2018203682 A1 | 11/2018 |

OTHER PUBLICATIONS

International Search Report and Written Opinion—PCT/US2020/041727—ISA/EPO—dated Nov. 20, 2020.
Partial International Search Report—PCT/US2020/041727—ISA/EPO—dated Sep. 23, 2020.
Qualcomm Incorporated: "UL Signals and Channels for NR-U", 3GPP TSG RAN WG1 Meeting #97, 3GPP Draft; R1-1907260 7.2.2.1.3 UL Signals and Channels for NR-U, 3rd Generation Partnership Project (3GPP), Mobile Competence Centre; 650, Route Des Lucioles; F-06921 Sophia-Antipolis Cedex; Fran, vol. RAN WG1, No. Reno, U.S.; May 13, 2019-May 17, 2019, 19 Pages, May 13, 2019 (May 13, 2019), XP051728700, Section 3.2.

* cited by examiner

| Short PUCCH formats | SR without HARQ-ACK | | 1-bit HARQ-ACK with SR | | 2-bit HARQ-ACK with SR | | 1-bit HARQ-ACK without SR | | 2-bit HARQ-ACK without SR | |
|---|---|---|---|---|---|---|---|---|---|---|
| | 1-symbol duration | 2-symbol duration | 1-symbol duration | 2-symbol duration | 1-symbol duration | 2-symbol duration | 1-symbol duration | 2-symbol duration | 1-symbol duration | 2-symbol duration |
| PF0 | 12 | 24 | 3 | 6 | 1 | 2 | 6 | 12 | 3 | 6 |
| PF2 | 4 | 8 | 4 | 8 | 4 | 8 | 4 | 8 | 4 | 8 |

| Long PUCCH formats | SR without HARQ-ACK | SR with 1~2 bit(s) HARQ-ACK | 1~2 bit(s) HARQ-ACK without SR |
|---|---|---|---|
| PF1 | 84 (12*7) | 84 (12*7) | 84 (12*7) |
| PF3 | 48 (12*4) | 48 (12*4) | 48 (12*4) |

UE multiplexing capacity (CDM)

FIG. 5

| Method | CM (dB) |
|---|---|
| Rel 15 length 12 seq | 0.23 |
| Length 12 seq 10 times rep. | 11.47 |
| Cycle through cyclic shifts | 1.46 |
| 120 length Long ZC sequence | 2.11 |
| Cycle through root indices | 4.24 |
| Random scrambling tone wise (+/-1) | 4.84 |
| Random scrambling RB wise (+/-1) | 7.39 |
| Random phase rotation RB wise | 6.81 |
| Random phase rotation tone wise | 4.79 |

FIG. 6

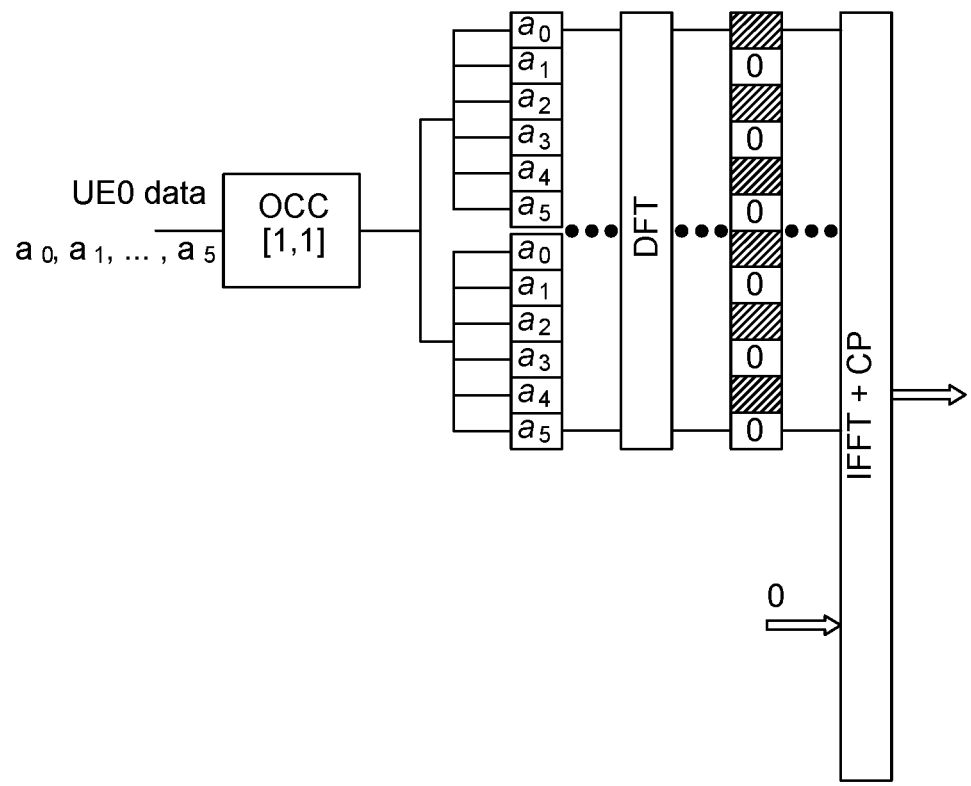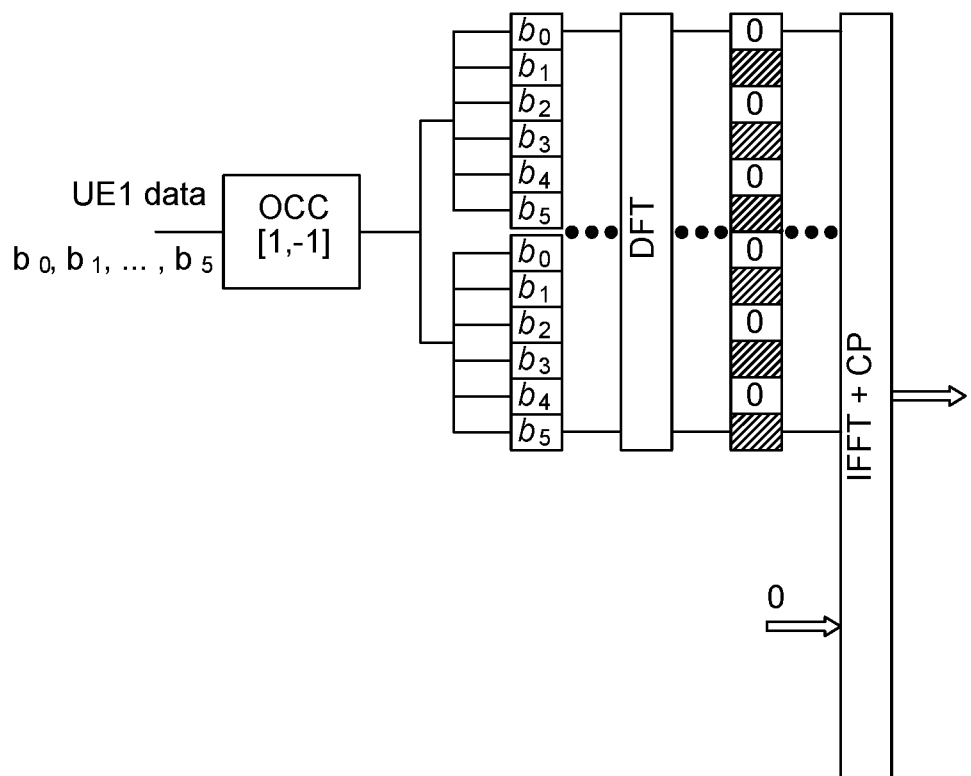
FIG. 11

ENHANCEMENT OF PHYSICAL UPLINK CONTROL CHANNEL (PUCCH) FORMAT

CROSS-REFERENCE TO RELATED APPLICATIONS

The present application for patent claims priority to and the benefit of Indian Application No. 2019/41028190, filed on Jul. 13, 2019, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for enhancing transmission of a physical uplink control channel (PUCCH).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a user equipment (UE). The method generally includes obtaining payload bits to be conveyed in a physical uplink control channel (PUCCH) transmission via an interlace of resource blocks (RBs), determining a group of the RBs available to the UE, and transmitting the payload bits using the determined group of RBs, wherein the transmitting involves modulating different RBs of the group by at least one of different payload bits or sequences.

Certain aspects of the disclosure relate to a method for wireless communication by a user equipment (UE). The method generally includes obtaining payload bits to be conveyed in a physical uplink control channel (PUCCH) transmission via an interlace of resource blocks (RBs), determining a long sequence allocated to the UE, wherein the long sequence has a length greater than a number of tones in each RB, the long sequence is selected from a set of long sequences that allow for multiplexing with other UEs using the same interlace of RBs, and each of the long sequences exhibits local orthogonality with other long sequences in the set, and transmitting the payload bits using a set of tones of the RBs and the long sequence allocated to the UE.

Certain aspects of the disclosure relate to a method for wireless communication by a user equipment (UE). The method generally includes obtaining payload bits to be conveyed in a physical uplink control channel (PUCCH) transmission via an interlace of resource blocks (RBs) and using a sequence of cyclic shifts to be applied across the interlace of RBs to denote values of the payload bits.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 summarize multiplexing capacity for various PUCCH formats.

FIG. 6 illustrates performance of example PUCCH transmission enhancements.

FIG. 11 illustrates a third scheme for PUCCH transmission enhancement, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
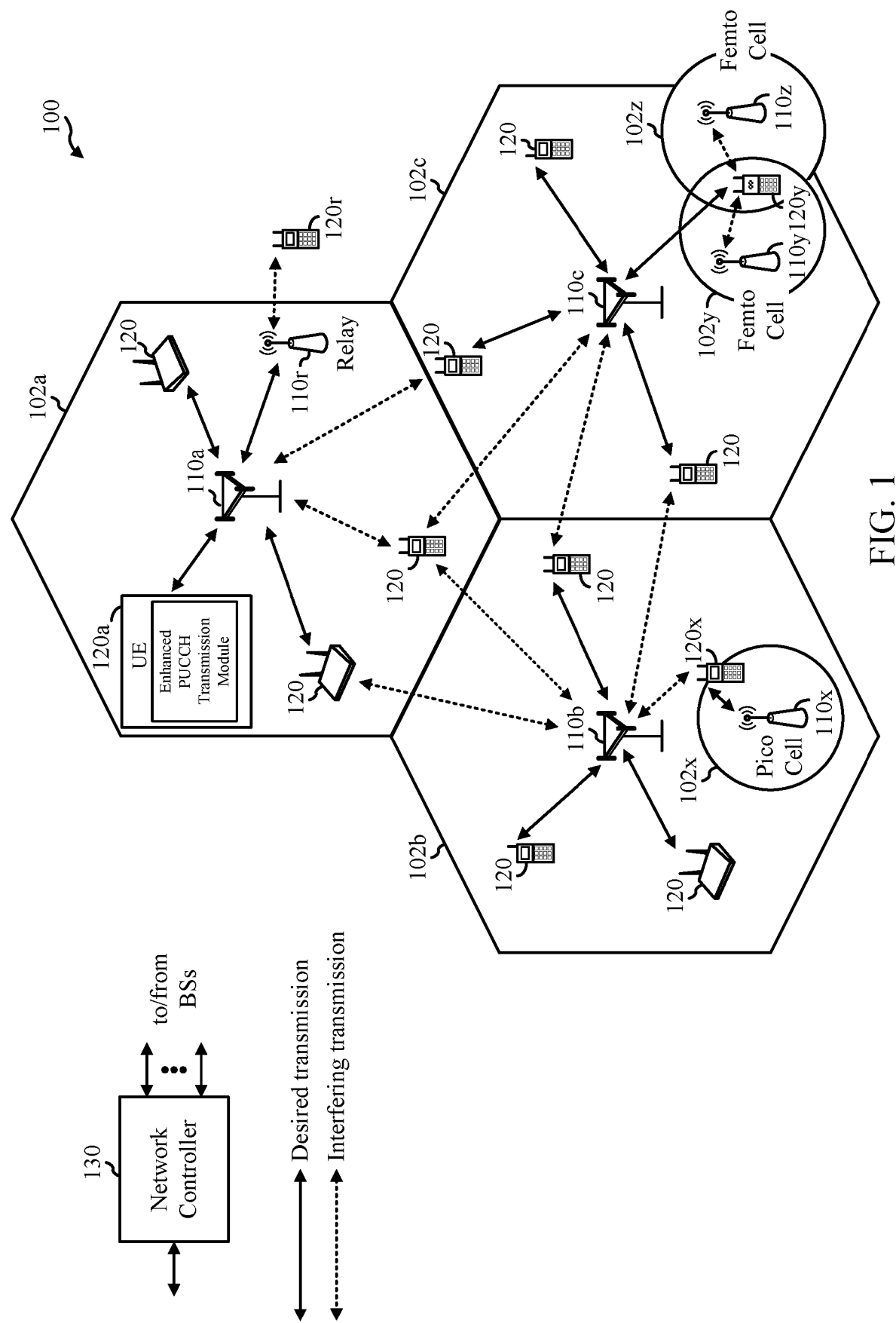
FIG. 1 is a block diagram conceptually illustrating an example telecommunications system, in accordance with certain aspects of the present disclosure.

Aspects of the present disclosure provide apparatus, methods, processing systems, and computer readable mediums for enhanced physical uplink control channel (PUCCH) transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120a in the wireless communication network 100 may have a module for enhanced PUCCH transmission, using one or more of various schemes presented herein, while a base station 110 may perform complementary processing to process a PUCCH transmitted by the UE 120a.

For example, the CSI report configuration configures the UE 120 to determine precoding matrix information and an FD basis selection for each transmission layer based at least in part on an intermediate set size, wherein the intermediate set size is known between devices (e.g., base station and UE) and based on a wireless network configuration or rule. The UE 120 may report, in a UCI, the FD basis selection for the specific transmission layer.

As illustrated in FIG. 1, the wireless communication network 100 may include a number of base stations (BSs) 110 and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
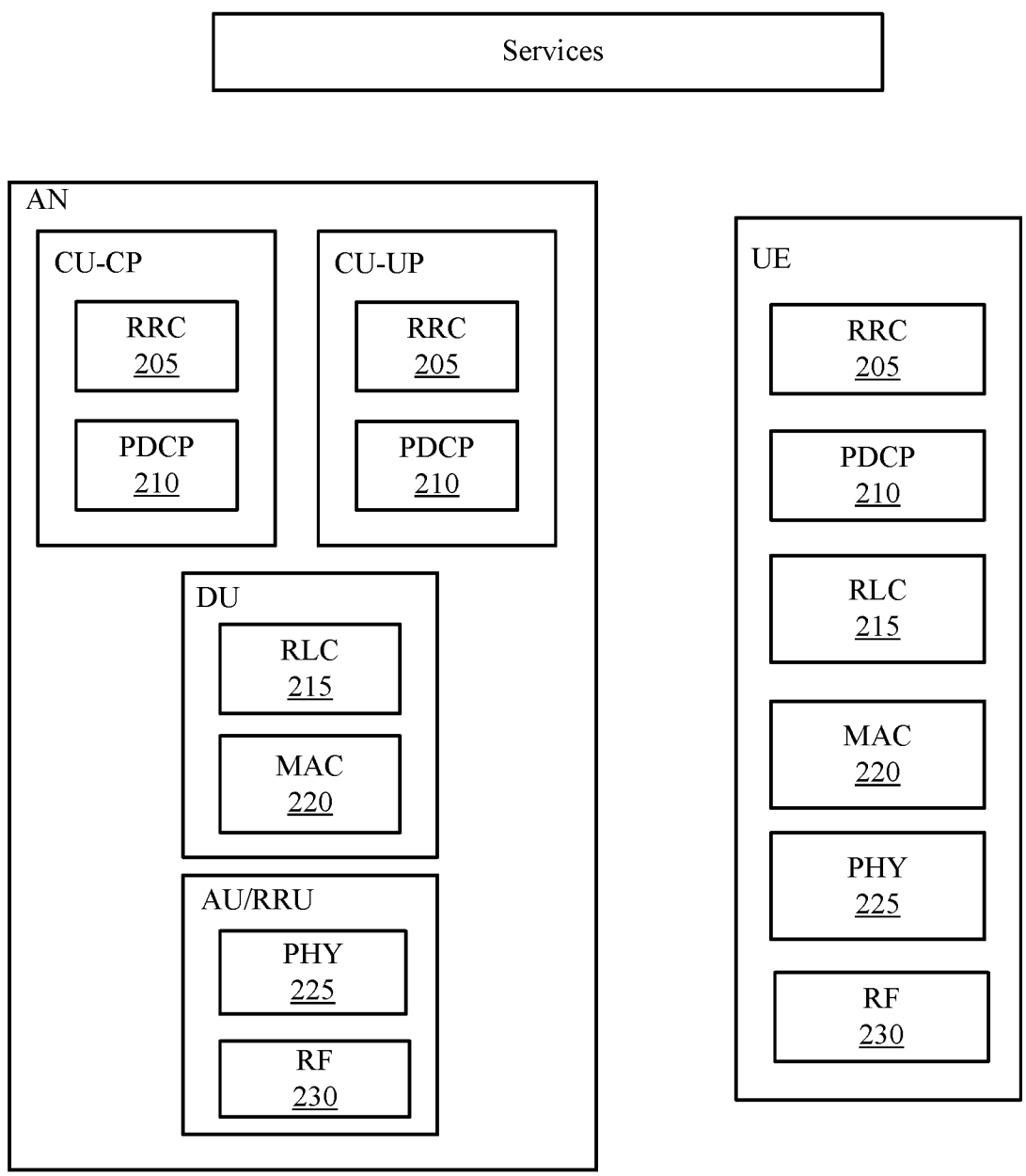
FIG. 2 is a block diagram showing examples for implementing a communication protocol stack in the example RAN architecture, in accordance with certain aspects of the present disclosure.

FIG. 2 illustrates a diagram showing examples for implementing a communications protocol stack in a RAN (e.g., such as the RAN 100), according to aspects of the present disclosure. The illustrated communications protocol stack 200 may be implemented by devices operating in a wireless communication system, such as a 5G NR system (e.g., the wireless communication network 100). In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 2, the system may support various services over one or more protocols. One or more protocol layers of the protocol stack 200 may be implemented by the AN and/or the UE.

As shown in FIG. 2, the protocol stack 200 is split in the AN (e.g., BS 110 in FIG. 1). The RRC layer 205, PDCP layer 210, RLC layer 215, MAC layer 220, PHY layer 225, and RF layer 230 may be implemented by the AN. For example, the CU-CP may implement the RRC layer 205 and the PDCP layer 210. A DU may implement the RLC layer 215 and MAC layer 220. The AU/RRU may implement the PHY layer(s) 225 and the RF layer(s) 230. The PHY layers 225 may include a high PHY layer and a low PHY layer.

The UE may implement the entire protocol stack 200 (e.g., the RRC layer 205, the PDCP layer 210, the RLC layer 215, the MAC layer 220, the PHY layer(s) 225, and the RF layer(s) 230).

Figure 3:
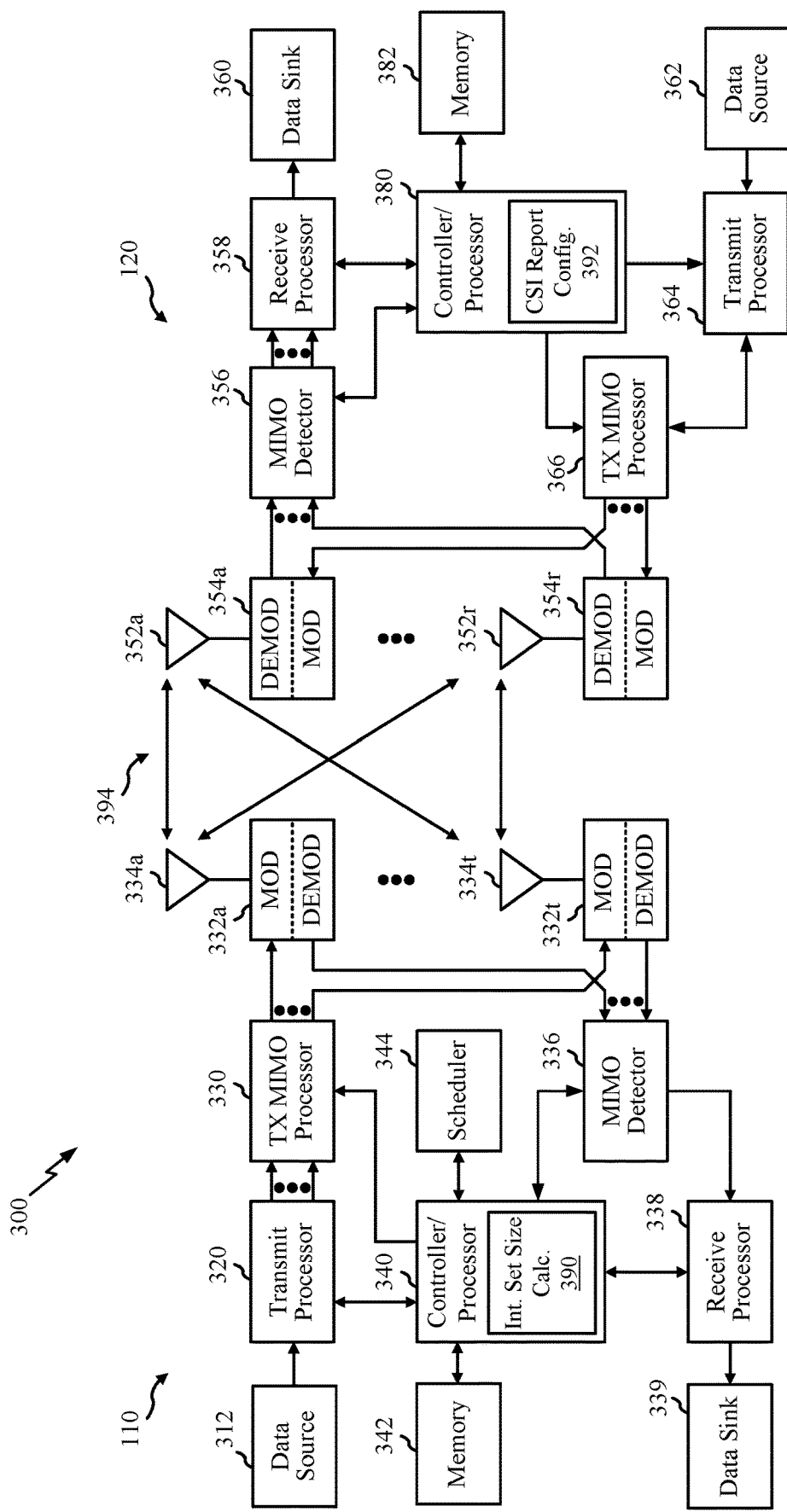
FIG. 3 is a block diagram conceptually illustrating a design of an example base station (B S) and user equipment (UE), in accordance with certain aspects of the present disclosure.

FIG. 3 illustrates example components of BS 110 and UE 120 (as depicted in FIG. 1), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the BS 110 may be used to perform the various techniques and methods described herein. For example, as shown in FIG. 3, the processor 340 has an intermediate set size calculation module 390 that may be configured for determining precoding matrix information, including, for each layer, a common indication of a size of an intermediate set of frequency domain (FD) bases and an FD basis selection based on the intermediate set size. The intermediate set size calculation module 390 may also configure the UE 120 to report, in a first part of uplink control information (UCI), the indication of the size of the intermediate set of FD bases across all layers and, in a second part of UCI, the FD basis selection for the specific transmission layer, according to aspects described herein. For example, as shown in FIG. 3, the processor 380 has a CSI report configuration module 392 that may be configured for generating one or more CSI report parameters and transmitting the parameters to the UE, according to aspects described herein.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 to a data sink 360, and provide decoded control information to a controller/processor 380.

In a MIMO system, a transmitter (e.g., BS 110) includes multiple transmit antennas 354a through 354r, and a receiver (e.g., UE 120) includes multiple receive antennas 352a through 352r. Thus, there are a plurality of signal paths 394 from the transmit antennas 354a through 354r to the receive antennas 352a through 352r. Each of the transmitter and the receiver may be implemented, for example, within a UE 120, a BS 110, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The processor 340 and/or other processors and modules at the BS 110 may perform or direct the execution of processes for the techniques described herein. The memories 342 and 382 may store data and program codes for BS 110 and UE 120, respectively. A scheduler 344 may schedule UEs for data transmission on the downlink and/or uplink.

Figure 4:
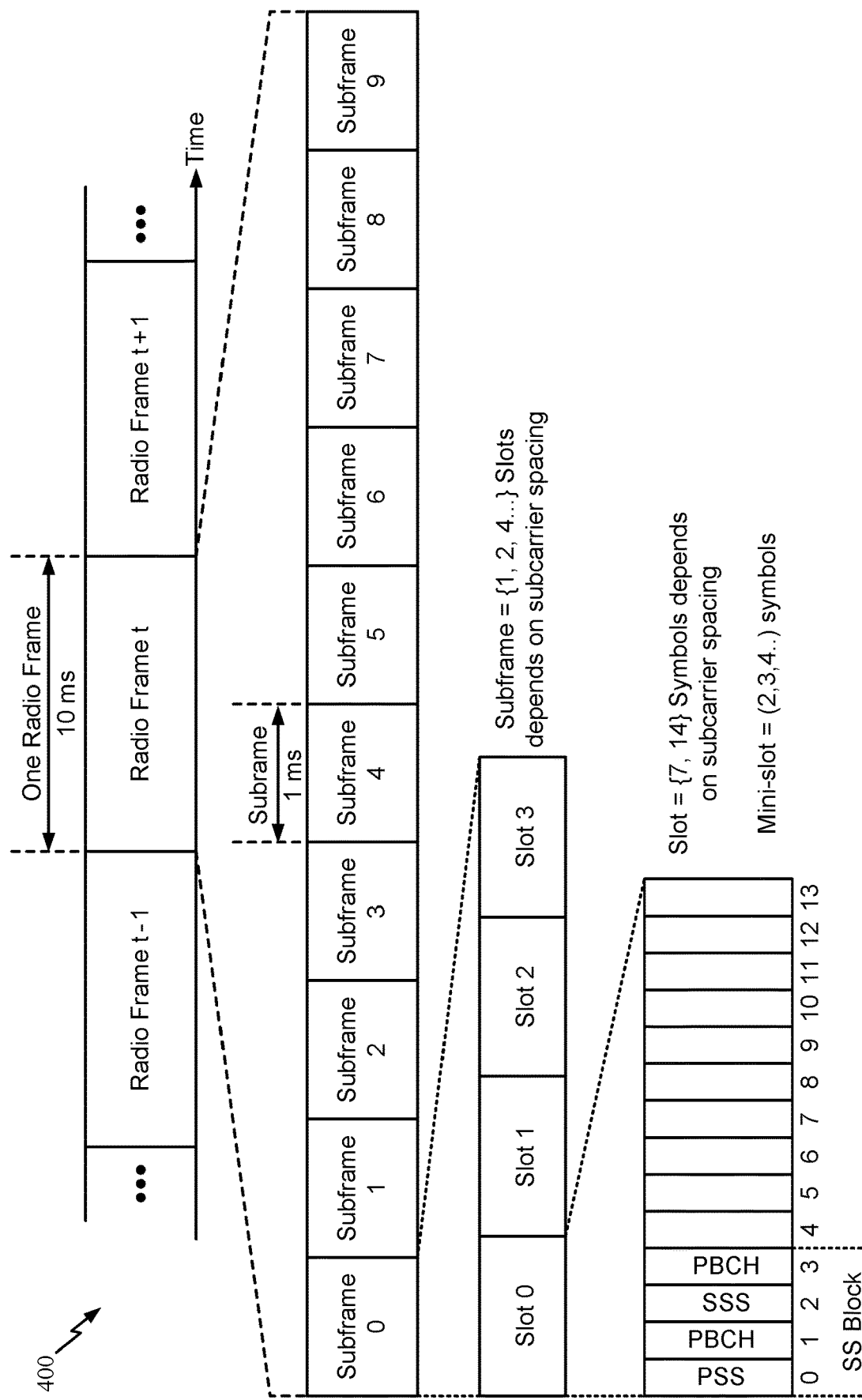
FIG. 4 illustrates an example of a frame format for a telecommunication system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Enhanced PUCCH Format

Certain aspects of the present disclosure provide techniques for enhanced physical uplink control channel (PUCCH) transmission. For example, the techniques provided herein may be used to enhance PUCCH of NR format 0. As will be described in greater detail below, enhancements (relative to current PUCCH transmissions) may include increased reliability of all or certain payload bits and/or an increase in user multiplexing capacity.

Some PUCCH formats define what is commonly referred to as a "Short-PUCCH" referring to the length/duration of (1-2 OFDM symbols) and uplink control information (UCI) payload of 2 bits or less.

For a 1-symbol short-PUCCH with UCI payload (of 2 bits or less) and with/without a scheduling request (SR) bit, a sequence with low PAPR may be selected to convey particular bit values. For simultaneous transmission of 2-bit HARQ-ACK and SR, PUCCH format 0 may be used. Conventionally, only computer generated sequences (CGS) sequences of length 12 with consecutive mapping within a PRB are supported (in NR Rel-15). The supported number of base sequences is 30, while the number of cyclic shifts available for one base sequence is 12.

A 2-symbol short-PUCCH may be used to convey a UCI payload (of 2 bits or fewer) with or without an SR bit. A 2-symbol PUCCH may be composed of two 1-symbol PUCCHs conveying the same UCI (in each symbol).

The following set of CG sequences (CGSs) are specified:

$$r_k(n) = \exp(j\pi \varphi_k(n)/4), n=0,1,\ldots,11.$$

These sequences are also used for other purposes, such as DMRS for PUCCH format 1, 3 and 4 and their multi-slot variants, as well as UCI for PUCCH format 1.

For HARQ-ACK transmission (an example of UCI), in the case of 1-bit HARQ-ACK only, the distance between the two cyclic shifts (CSs) within a PRB is 6 and the values may be indicated by:

For NACK: CS=Cinitial: and
For ACK: CS=(Cinitial+6) mod 12.

In case of 2-bit HARQ-ACK only, the distance between any two adjacent cyclic shifts within a PRB is 3. In this case, the four possible values may be:

For NACK/NACK: CS=Cinitial;
For NACK/ACK: CS=(Cinitial+3) mod 12;
For ACK/ACK: CS=(Cinitial+6) mod 12; and
For ACK/NACK: CS=(Cinitial+9) mod 12.

For PUCCH conveying HARQ-ACK and SR, in the case of negative (no) SR, the same PUCCH resources as for HARQ-ACK only transmission may be used. In the case of positive SR, HARQ-ACK may also transmitted on the PRB for HARQ-ACK only transmission. In such a case, the mapping of ACK and NACK to cyclic shifts may be based on the index of initial cyclic shift of the HARQ-ACK only (Cinitial) and a fixed mapping pattern as follows. For single-bit HARQ-ACK, the two values may be:

For NACK: CS=(Cinitial+3) mod 12; and
For ACK: CS=(Cinitial+9) mod 12.
For two-bit HARQ-ACK, the four values may be:
NACK/NACK: CS=(Cinitial+1) mod 12;
NACK/ACK: CS=(Cinitial+4) mod 12;
ACK/ACK: CS=(Cinitial+7) mod 12; and
ACK/NACK: CS=(Cinitial+10) mod 12.

Given this conventional approach, one PRB can support simultaneous transmission of 2-bit HARQ-ACK with SR for only one UE. The four remaining resources, however, may be used for other purposes (e.g. 1-bit A/N with SR or 2-bit A/N only).

Various techniques may be used to allow for multiplexing of multiple UEs using PUCCH format 0 (PF0). For example, for a 1 symbol PUCCH, 12 cyclic shifts may be possible. As illustrated in FIG. 5, in this case, 12 UEs may be multiplexed for PUCCH conveying SR (only), 6 UEs for PUCCH conveying 1-bit ACK, or 3 UEs for PUCCH conveying 2-bit ACK. An increased number of UEs may be multiplexed for 2 symbol PUCCH, for example, by applying time division orthogonal cover codes (TD-OCCs) across symbols (e.g., which may double the number of UEs that can be multiplexed).

Expanding NR to utilize unlicensed spectrum (NR-U), various enhancements to certain PUCCH formats (e.g., PF0 and PF1) are possible. For example, payload bits may be mapped to physical resources of one full interlace in 20 MHz (where an interlace refers to mapping to frequency resources in different RBs, for example, in order to meet occupied channel bandwidth "OCB" requirements). Various sequence types and mapping schemes may consider the following alternatives (Alts):

Alt-1: Repetition of the length-12 Rel-15 PF0 and PF1 sequence in each PRB of an interlace with mechanism to control PAPR/CM considering the following alternatives;

Alt-1a: Cycling of cyclic shifts across PRBs;
Alt-1b: Phase rotation across PRBs of an interlace where the phase rotation is can be per RE or per PRB;
Alt-2: Mapping of different length-12 Rel-15 PF0 and PF1 sequences to the PRBs of an interlace based on different group number u (range is 0 . . . 29); and
Alt-3: Mapping of a single long sequence to the PRBs of an interlace.

The impact of such alternatives due to guardbands may be further studied and decisions on the above alternatives may be made considering at least performance using certain metrics and considering impacts on standard specifications.

As noted above, in NR, PUCCH format 0 occupies 1 PRB. In NR-U, PUCCH may need to occupy at least one full interlace (e.g., occupying 10 PRBs). This can be done in the various ways:

Repeat 1 PRB across 10 PRBs. Different PAPR reduction techniques may be used such as a phase ramp or phase rotation or scrambling;

Use different cyclic shifts of the NR length 12 ZC sequence in different RBs across the interlace;

Gives best PAPR reduction;

Use different root indices to generate different NR length 12 ZC sequences in different RBs across the interlace; and/or Use a 120 length ZC sequence.

FIG. 6 is a table that summarizes various such schemes for PUCCH enhancement.

Aspects of the present disclosure propose various enhancements using repetition, long sequence methods, or both.

Figure 7:
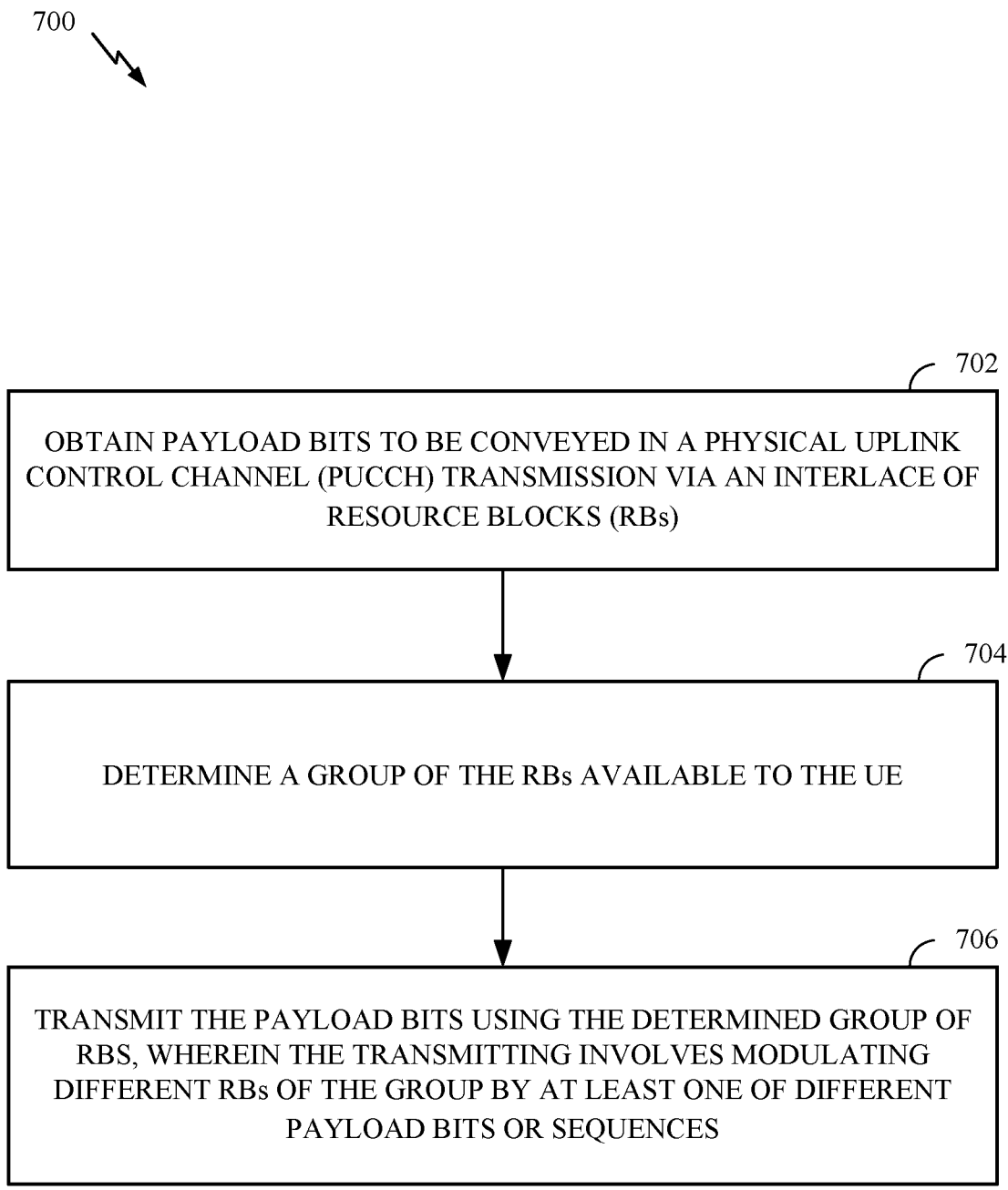
FIG. 7 illustrates example operations for a first PUCCH transmission enhancement by a UE, in accordance with certain aspects of the present disclosure.

FIG. 7 illustrates example operations 700 that a UE may perform for enhanced PUCCH transmission, in accordance with certain aspects of the present disclosure. The example operations 700 may be performed, for example, by UE 120a of FIG. 1.

Operations 700 begin, at 702, by obtaining payload bits to be conveyed in a physical uplink control channel (PUCCH) transmission via an interlace of resource blocks (RBs). At 704, the UE determines a group of the RBs available to the UE. At 706, the UE transmits the payload bits using the determined group of RBs, wherein the transmitting involves modulating different RBs of the group by at least one of different payload bits or sequences.

The scheme covered in operations 700 may be considered a form of payload spitting, which may help enhance PUCCH transmission, for example, by increasing multiplexing capacity. As noted above, format 0 multiplexing (MUX) capacity is generally limited, but support for multiple users is still desired in NR-U. Formats like Format 3 can potentially support as many as 12 users. Thus, it may be beneficial to increase MUX capacity.

The additional PRBs at hand in NR-U may be used to increase MUX capacity at reduced cost in terms of negligible performance degradation.

Figure 8:
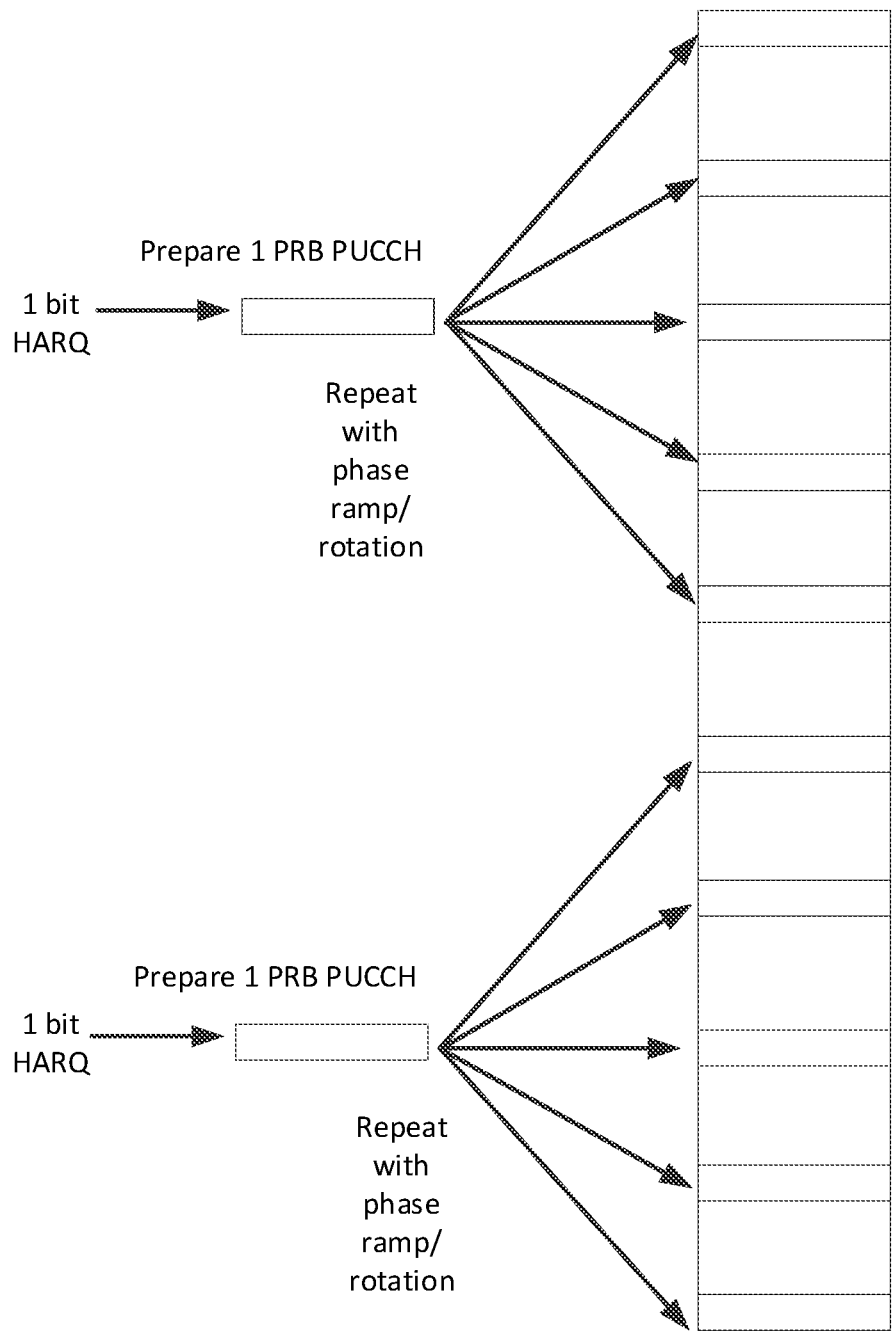
FIG. 8 illustrates a first scheme for PUCCH transmission enhancement, in accordance with certain aspects of the present disclosure.

In some aspects, for 2-bit encoding using Format 0, the first bit (of the 2 bits) may be used to choose a cyclic shift and generate 1 PRB which may be repeated, for example, as shown in FIG. 8, across the first X PRBs (e.g., assuming X=5, RBs 0-4). The second bit may be used to choose another cyclic shift to generate another PRB, which may be repeated across the next 10-X PRBs (e.g., again assuming X=5, RBs 5-9).

According to certain aspects, the first and second PRBs may be repeated according to a pattern, such as the first PRB repeated across even PRBs (e.g., RBs 0, 2, 4, 6, 8), while the other PRB may be repeated across odd PRBs (e.g., RBs 1, 3, 5, 7, 9). This approach may result in improved frequency diversity as each PRB is spread across a greater range of PRBs.

In this example, assuming 6 cyclic shifts are available, 6 UEs can be multiplexed. In some cases, mechanisms may be used to reduce PAPR due to the repetitions. Examples of such mechanisms may include phase ramping, phase rotation, scrambling, and/or using different root sequences, all or any combination of which can be used instead of repetition.

In certain aspects, UE multiplexing for PUCCH transmissions with SR and 2-bit HARQ may be increased. In this example, the SR and first HARQ bit may be used to choose a cyclic shift and generate a first PRB, which may be repeated across the first 5 PRBs (e.g., RBs 0-4). The second HARQ bit may be used to choose a cyclic shift to generate another PRB, which may be repeated across the next 5 PRBs (e.g., RBs 5-9). In some cases, 3 UEs may be multiplexed according to this method.

As 2 bits may be conveyed in the first 5 PRBs and only a single bit may be conveyed with the remaining 5 PRBs, this approach may create uneven performance between first 5 PRBs and next 5 PRBs. This uneven performance may be addressed by using the SR and first HARQ bits to modulate X PRBs (e.g., where 10>X>5), while 10-X PRBs are used for the other HARQ bit. This may provide for a more even performance among the two sets of PRBs.

According to another example for SR and 2-bit of HARQ, 1 HARQ bit may be transmitted using X PRBs (e.g., where 1<X<5), SR may modulate 10-2X PRBs, while a second HARQ bit is transmitted using the remaining X PRBs. At least two options may be possible regarding SR. According to a first option, the SR bit may always sent (e.g., a 0 or a 1). According to another option, SR may only sent when SR is 1. Otherwise, those RBs may be left blank.

In some cases, the SR modulated PRBs may be placed in the middle, such that even if SR is not transmitted, the border PRBs modulated by HARQ bits can still meet OCB constraints.

In some cases, the examples discussed above may be generalized for 1 for 2 symbols. For example, for 2 symbol PUCCH format 0 carrying 2 HARQ bits, each symbol may carry a different ACK/NACK bit. In some cases, for 2 symbol PUCCH format 0 carrying 2 HARQ bits and SR, either symbol may carry 1 HARQ bit and the SR bit, while the other symbol carries other HARQ bit (e.g., Symbol 1 has the 1st HARQ bit and SR, 2nd symbol carries the 2nd HARQ bit).

In some cases, for 2 symbol PUCCH, with or without SR, X RBs (e.g., among the available 20 RBs) may carry 1 HARQ bit and SR if available, while the remaining 20-X RBs carry the other HARQ bit. In such cases, the X and 20-X can include PRBs on both symbols.

In certain aspects, enhanced PDCCH transmission may involve modifying cyclic shift mapping. Currently, a UE with SR plus HARQ bits to transmit uses the following cyclic shifts: 0, 3, 6, and/or 9. If UE0, UE1, and UE2 are multiplexed, the cyclic shifts may be allocated as follows:

UE0 uses 0/3/6/9, with the following meanings:
0: NACK+negative SR;
3: NACK+positive SR;
6: ACK+negative SR; and
9: ACK+positive SR;
UE1 uses 1/4/7/10 with the following meanings
1: NACK+negative SR;
4: NACK+positive SR;
7: ACK+negative SR; and
10: ACK+positive SR; and
UE2 uses 2/5/8/11 with the following meanings
2: NACK+negative SR;
5: NACK+positive SR;
8: ACK+negative SR; and
11: ACK+positive SR.

In some cases, a timing error in the receiver might cause a missed detection and a false alarm (e.g., one cyclic shift is mis-detected as another). Given the mappings above, both SR and HARQ bits may have equal missed detection and/or false alarm rates. However, it may be desirable to have the HARQ bit better protected (lower detection and/or false alarm rate) when compared to the SR bit.

In some cases, this may be achieved by changing the cyclic shift allocations. For example, cyclic shifts may be allocated as follows:

UE 0 uses 0/1/6/7;
UE 1 uses 2/3/8/9; and
UE 2 uses 4/5/10/11.

Using such a mapping, if Cyclic shift 0 is (mis-)detected as cyclic shift 1, UE0 HARQ bit is detected correctly, since cyclic shifts 0 and 1 are both used to convey a the same ACK/NACK value (of a NACK).

Figure 9:
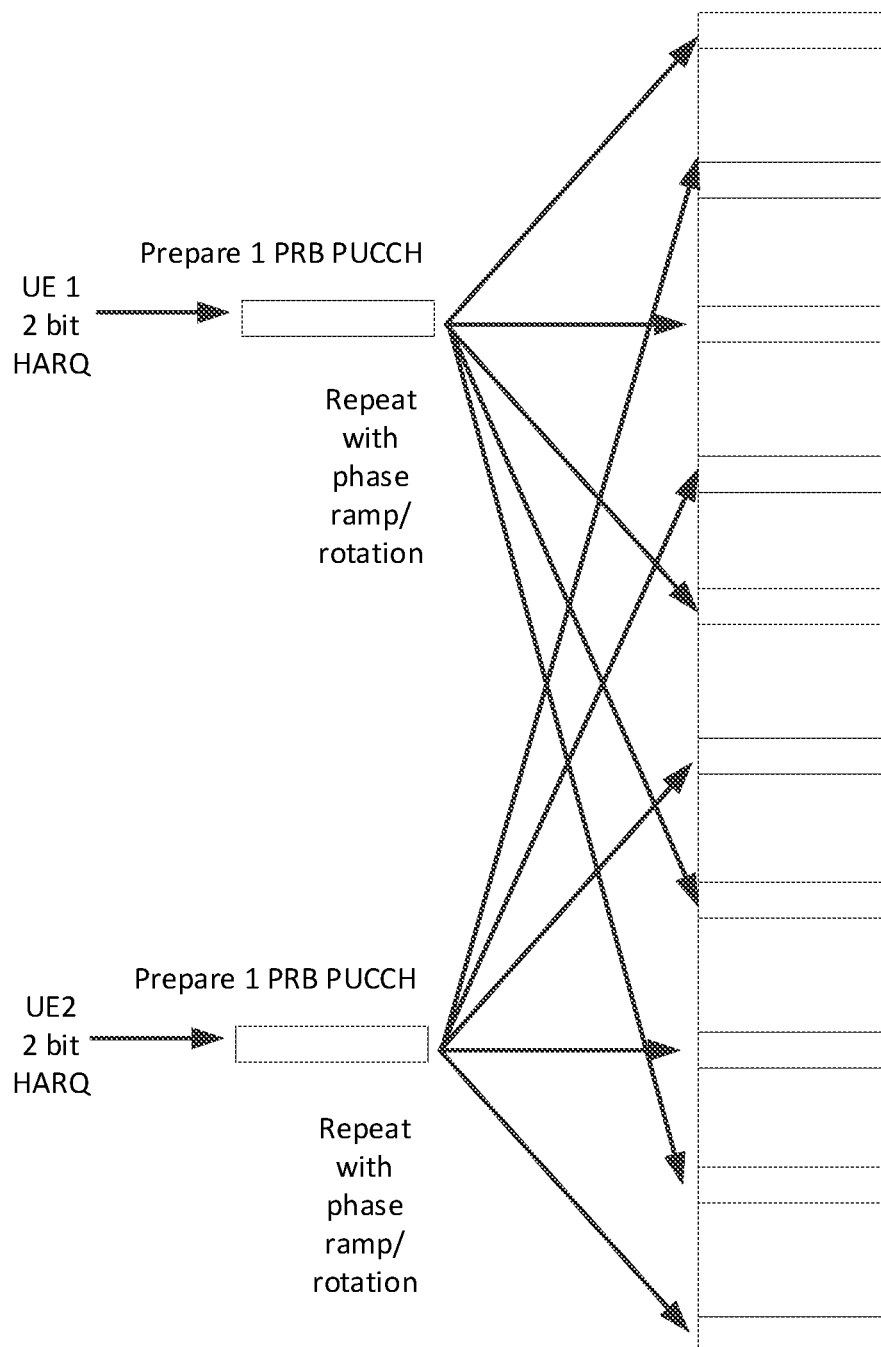
FIG. 9 illustrates a second scheme for PUCCH transmission enhancement, in accordance with certain aspects of the present disclosure.

In some cases, a partial interlace may be used to enhance multiplexing UEs. According to this example, X bits with or without SR may be encoded into 1 PRB (e.g., as per NR), where X can be 0, 1 or 2. This PRB may then be repeated (e.g., 5 times), as shown in the example of FIG. 9. For example, 5 virtual RBs may be mapped onto 5 physical RBs (e.g., which may be either odd or even, and set in one interlace). In the illustrated example, PRBs for UE 1 are repeated on even PRBs, while PRBs for UE 2 are repeated on odd PRBs.

Using the partial interlace example shown in FIG. 9, user multiplexing gain may double compared to conventional NR. This approach may apply to all cases of 1 or 2 bit HARQ with or without SR, and/or for SR only cases as well. While the partial interlace example for enhancing user multiplexing may not always meet the OCB requirement (of 80% in some cases), it may be useful under different OCB regulations.

Figure 10:
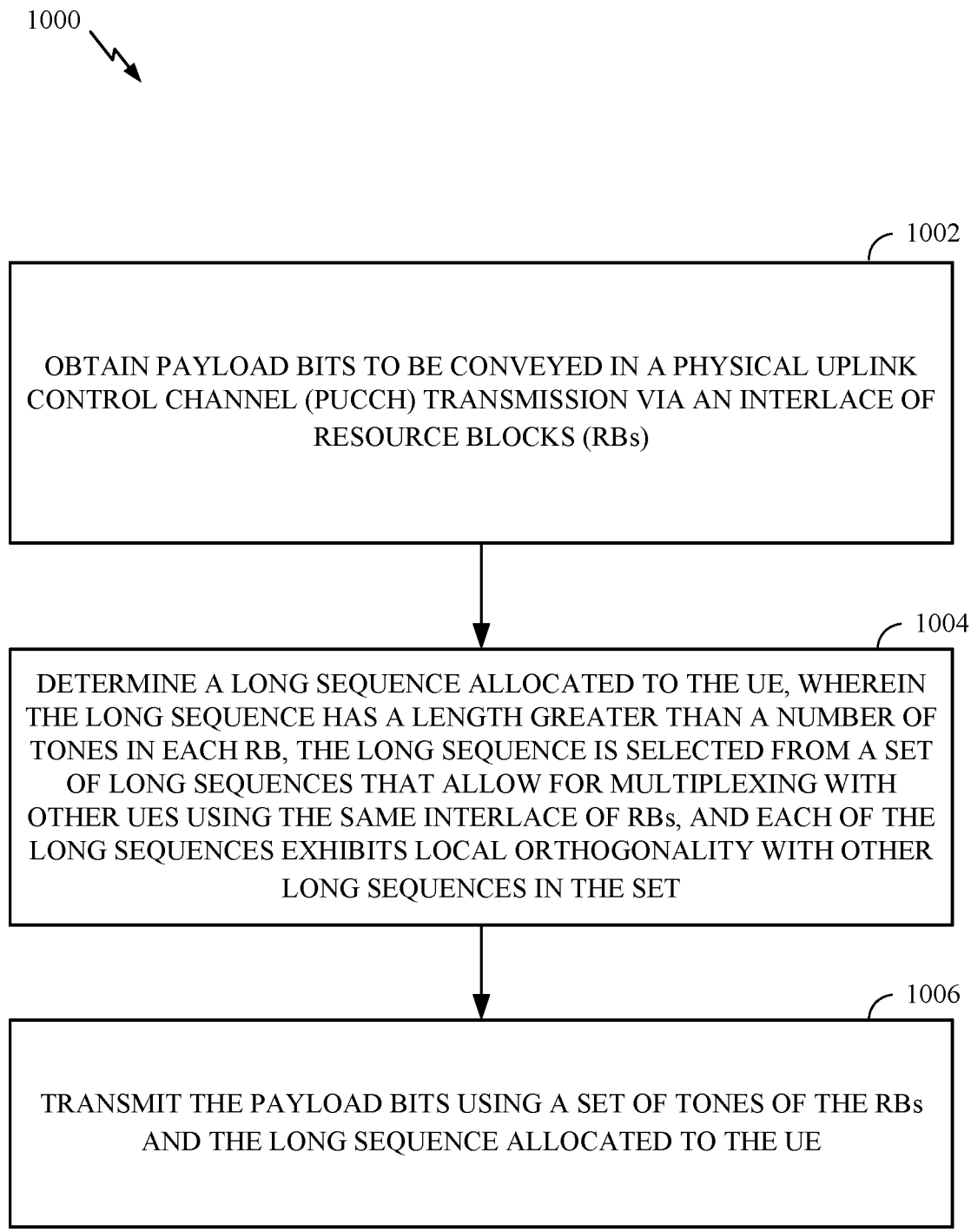
FIG. 10 illustrates example operations for a first PUCCH transmission enhancement by a UE, in accordance with certain aspects of the present disclosure.

FIG. 10 illustrates example operations 1000 that a UE may perform for another proposal for enhanced PUCCH transmission, in accordance with certain aspects of the present disclosure. The example operations 1000 may be performed, for example, by the UE 120a of FIG. 1.

Operations 1000 begin, at 1002, by obtaining payload bits to be conveyed in a physical uplink control channel (PUCCH) transmission via an interlace of resource blocks (RBs). At 1004, the UE determines a long sequence allocated to the UE, wherein the long sequence has a length greater than a number of tones in each RB, the long sequence is selected from a set of long sequences that allow for multiplexing with other UEs using the same interlace of RBs, and each of the long sequences exhibits local orthogonality with other long sequences in the set. At 1006, the UE transmits the payload bits using a set of tones of the RBs and the long sequence allocated to the UE.

In some cases, the long sequences may be long (e.g., 120 bit length) Zadoff-Chu (ZC) sequences with local orthogonality. For 120 bit length PUCCH, UE multiplexing may be accomplished by applying orthogonal cover codes (OCCs) on top of the 120 bit length ZC sequence. As an example, assuming a 2 UE scenario, and a ZC sequence of a0, a1, . . . , a119:

UE0 uses a0, a1, a2, a3, . . . , a118, a119; and
UE1 uses a0, −a1, a2, −a3, . . . , a118, −a119.

In this scenario, UE1's signal is the same ZC sequence with cyclic shift 60.

As another example, assuming a 4 UE scenario, and a ZC sequence of a0, a1, a119:

UE0 uses a0, a1, a2, a3, . . . , a118, a119;
UE1 uses a0, j*a1, −a2, −j*a3, . . . , a116, j*a117, −a118, −j*a119;
UE2 uses a0, −a1, a2, −a3, . . . , a118, −a119; and
UE3 uses a0, −j*a1, −a2, j*a3, . . . , a116, −j*a117, −a118, j*a119.

In this example, UE1's signal is the same ZC sequence with cyclic shift 30. This approach may allow the long ZC sequence to have a low PAPR, and PUCCH sequences for different UEs may be locally orthogonal (which may aid in the presence of frequency selectivity). Using this example method, 1, 2, 4, 6, or 12 users can be multiplexed.

According to some examples using long ZC sequences, different users can be allocated different tones. For instance, for 2 user multiplexing, both UEs may generate a 60 tone ZC sequence. As illustrated in FIG. 11, a first UE (UE0) may use even tones, while UE1 may use odd tones. Using this approach, up to 12 users may be multiplexed, where each user gets 12/N mux tones per RB. This approach may be similar to an NR PF 3/4, which uses a pre-DFT OCC to create this tone interlace pattern for DFT-s-OFDM.

According to another scheme, frequency domain orthogonal cover codes (FD-OCC) may be used with long ZC sequences. As an example, if N UEs are multiplexed, each UE may generate a 120/N length ZC sequence (e.g., where N can be 2, 3, 4, 5, or 10). Each tone may be expanded using a FD-OCC across N tones. This may be illustrated by the following example for a 2 UE case:

UE1 uses a0, a0, a1, a1, . . . a59, a59; and
UE2 uses a0, −a0, a1, −a1, . . . , a59, −a59.

In some cases, a combination of the two or more examples proposed herein may be used. For example, the partial interlace may be used for 1 bit acknowledgment/negative acknowledgment (A/N), while for 2 bit A/N the payload split scheme described above may be used.

Figure 12:
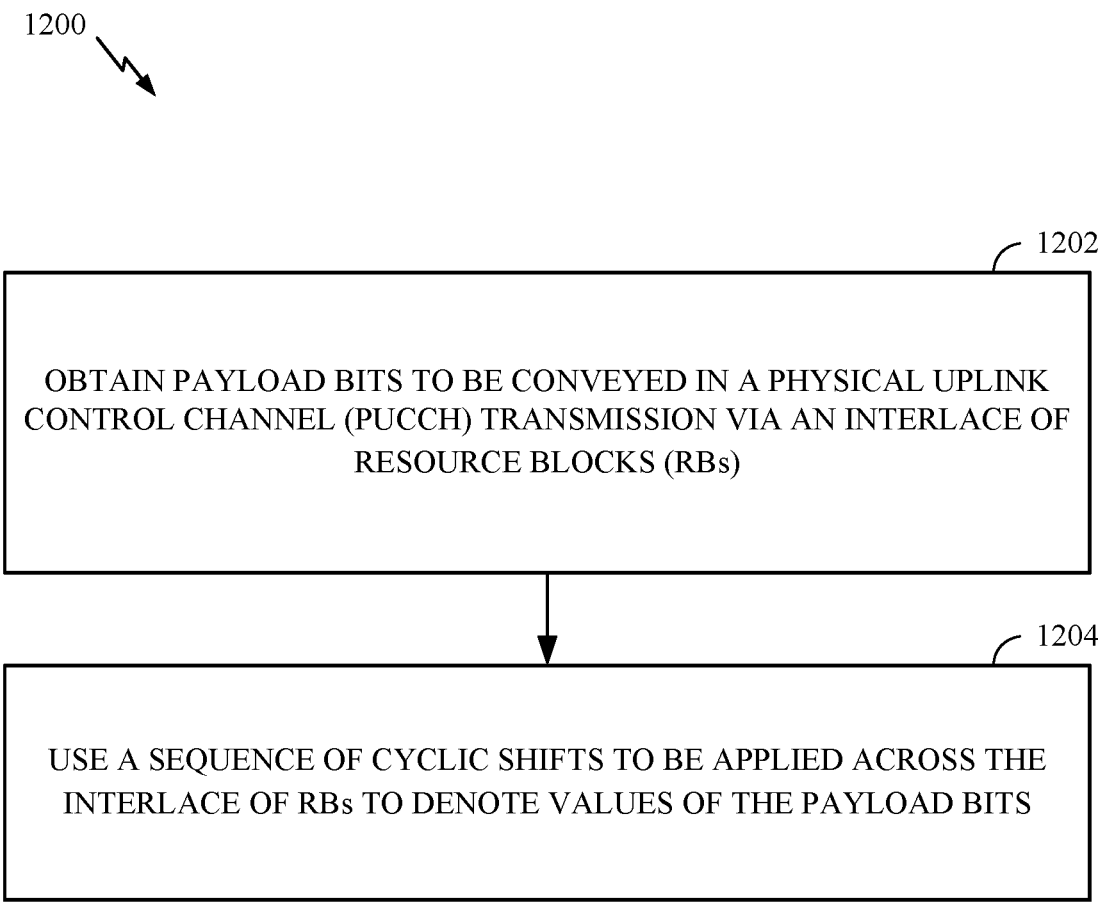
FIG. 12 illustrates example operations for a first PUCCH transmission enhancement by a UE, in accordance with certain aspects of the present disclosure.

FIG. 12 illustrates example operations 1200 that a UE may perform for another proposal for enhanced PUCCH transmission, in accordance with certain aspects of the present disclosure. The example operations 1200 may be performed, for example, by UE 120a of FIG. 1.

Operations 1200 begin, at 1202, by obtaining payload bits to be conveyed in a physical uplink control channel (PUCCH) transmission via an interlace of resource blocks (RBs). At 1204, the UE uses a sequence of cyclic shifts to be applied across the interlace of RBs to denote values of the payload bits.

According to this approach, cyclic shifts may be selected for both PAPR reduction and user multiplexing. One challenge is how to use cyclic shifts for user multiplexing if they are used for PAPR reduction. In some cases, a sequence of cyclic shifts to be applied across PRBs may be used to denote the information bit. For example: the initial cyclic shift may denote the ACK/NACK bits and the cyclic shift step size may denotes the SR bit.

For example, for UE0, the cyclic shift for RB0 may be chosen from {0, 3, 6, 9} depending upon the 2 ACK/NACK bit combination, while the Nth PRB may have a cyclic shift of {0, 3, 6, 9}+6*SR+N. In contrast, for UE1, the Nth PRB may have a cyclic shift of {1, 4, 7, 10}+6*SR+N. Similarly, for UE2, the Nth PRB may have a cyclic shift of {2, 5, 8, 11}±6*SR+N.

This approach may help ensure that every sequence has a step size of either 1 or 7 and, thus, may help maintain low PAPR/CM property. In some cases, 3 UEs can be multiplexed while ensuring the cyclic shift sequences do not match at any PRB.

EXAMPLE EMBODIMENTS

Embodiment 1: An apparatus for wireless communications by a user equipment (UE), comprising a memory; and a processor coupled with the memory, the memory and the processor configured to: obtain payload bits to be conveyed in a physical uplink control channel (PUCCH) transmission via an interlace of resource blocks (RBs); determine a group of the RBs available to the UE; and transmit the payload bits using the determined group of the RBs, wherein the transmitting involves modulating different RBs of the group by at least one of different payload bits or sequences.

Embodiment 2: The apparatus of Embodiment 1, wherein the payload bits comprise: at least two bits of uplink control information (UCI); or a scheduling request (SR) bit and at least one bit of UCI.

Embodiment 3: The apparatus of any of Embodiments 1-2, wherein: at least a first bit of the payload bits is sent using a first set of the RBs; and at least a second bit of the payload bits is sent using a second set of the RBs.

Embodiment 4: The apparatus of Embodiment 3, wherein: the UE selects a cyclic shift to convey a value of each bit; and the cyclic shifts are selected from a set of cyclic shifts allocated to the UE to allow for multiplexing with other UEs using the same interlace of the RBs.

Embodiment 5: The apparatus of any of Embodiments 1-4, wherein: the first bit is transmitted by repeating a same sequence in each RB in the first set of the RBs; and the second bit is transmitted by repeating a same sequence in each RB in the second set of the RBs.

Embodiment 6: The apparatus of Embodiment 5, wherein the memory and the processor are further configured to apply at least one of phase ramping, phase rotation, or scrambling to each sequence repetition of the first and second sets of the RBs.

Embodiment 7: The apparatus of any of Embodiments 1-6, wherein: the first bit it transmitted by using different root sequences across different RBs in the first set of the RBs; and the second bit it transmitted by using different root sequences across different RBs in the first set of the RBs.

Embodiment 8: The apparatus of any of Embodiments 1-7, wherein: the at least a first bit comprises a first bit of uplink control information (UCI) and one scheduling request (SR) bit; and the at least a second bit comprises a second bit of UCI.

Embodiment 9: The apparatus of Embodiment 8, wherein: a first subset of the first set of the RBs is used to transmit the first bit of UCI; and a second subset of the first set of the RBs is used to transmit the SR bit.

Embodiment 10: The apparatus of Embodiment 9, wherein: the SR bit is always sent as a same value; or the SR bit is only sent when the SR is a given value, otherwise each RB in the second subset of the first set of the RBs is left blank.

Embodiment 11: The apparatus of any of Embodiments 1-10, wherein the payload bits are transmitted across at least first and second symbols.

Embodiment 12: The apparatus of Embodiment 11, wherein: each symbol is used to transmit a different bit of uplink control information (UCI).

Embodiment 13: The apparatus of any of Embodiments 1-12, wherein: the first symbol carries a first bit of uplink control information (UCI) and a scheduling request (SR) bit; and the first symbol carries a second bit of UCI.

Embodiment 14: The apparatus of any of Embodiments 1-13, wherein at least one of the first set of the RBs or the second sets of the RBs includes RBs in both the first and second symbols.

Embodiment 15: The apparatus of any of Embodiments 1-14, wherein: the UE selects a cyclic shift to convey a combination of values of the payload bits; and the cyclic shifts is selected from a set of cyclic shifts allocated to the UE to allow for multiplexing with other UEs using the same interlace of the RBs, wherein the cyclic shifts allocated to each UE are designed to reduce a probability of a missed detection or false detection of a first bit of the payload bits, caused by a timing error, when compared to another bit of the payload bits.

Embodiment 16: The apparatus of any of Embodiments 1-15, wherein: determining the group of the RBs available to the UE comprises determining a partial set of the RBs of the interlace allocated to the UE.

Embodiment 17: An apparatus for wireless communications by a user equipment (UE), comprising: a memory; and a processor coupled with the memory, the memory and the processor configured to: obtain payload bits to be conveyed in a physical uplink control channel (PUCCH) transmission via an interlace of resource blocks (RBs); determine a long sequence allocated to the UE, wherein the long sequence has a length greater than a number of tones in each RB, the long sequence is selected from a set of long sequences that allow for multiplexing with other UEs using the same interlace of the RBs, and each of the long sequences exhibits local orthogonality with other long sequences in the set; and transmit the payload bits using a set of tones of the RBs and the long sequence allocated to the UE.

Embodiment 18: The apparatus of Embodiment 17, wherein each long sequence in the set exhibits local orthogonality based on an orthogonal cover code applied to a base sequence.

Embodiment 19: The apparatus of any of Embodiments 17-18, wherein the each long sequence in the set comprises Zadoff-Chu sequences.

Embodiment 20: The apparatus of any of Embodiments 17-19, wherein a length of each long sequence in the set corresponds to a number of tones in the interlace of the RBs.

Embodiment 21: The apparatus of any of Embodiments 17-20, wherein different UEs are allocated different tones of the interlace of the RBs.

Embodiment 22: The apparatus of any of Embodiments 17-21, wherein the UE generates the long sequence by expanding sequence of a first length using an orthogonal cover code (OCC).

Embodiment 23: The apparatus of Embodiment 22, wherein: N UEs are multiplexed; and each UE generates an intermediate sequence with a length based on N and a number of tones in the interlace; and each UE expands each tone of the intermediate sequence across N tones using the OCC.

Embodiment 24: An apparatus for wireless communications by a user equipment (UE), comprising: a memory; and a processor coupled with the memory, the memory and the processor configured to: obtain payload bits to be conveyed in a physical uplink control channel (PUCCH) transmission via an interlace of resource blocks (RBs); and use a sequence of cyclic shifts to be applied across the interlace of RBs to denote values of the payload bits.

Embodiment 25: The apparatus of Embodiment 24, wherein the payload bits comprise one or more uplink control information (UCI) bits and at least one scheduling request (SR) bit.

Embodiment 26: The apparatus of Embodiment 25, wherein: an initial cyclic shift denotes a value of the one or more UCI bits; and a cyclic shift step size of the sequence denotes a value of the SR bit.

Embodiment 27: The apparatus of any of Embodiments 24-26, wherein every sequence has a step size that is one of a subset of values.

Embodiment 28: The apparatus of any of Embodiments 24-27, wherein different UEs are allocated different sequences of cyclic shifts.

Embodiment 29: The apparatus of Embodiment 28, wherein the sequences of cyclic shifts are allocated to different UEs to ensure the sequences of cyclic shifts for the different UEs do not match at any RB.

Embodiment 30: A method for wireless communications by a user equipment (UE), comprising: obtaining payload bits to be conveyed in a physical uplink control channel (PUCCH) transmission via an interlace of resource blocks (RBs); determining a group of the RBs available to the UE; and transmitting the payload bits using the determined group of the RBs, wherein the transmitting involves modulating different RBs of the group by at least one of different payload bits or sequences.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various processor shown in FIG. 3 may be configured to perform operations 700, 1000, and 1200 of FIGS. 7, 10, and 12.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations described herein and illustrated in FIGS. 7, 10, and 12).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications by a user equipment (UE), comprising:
 a memory; and
 a processor coupled with the memory, the memory and the processor configured to:
 obtain payload bits to be conveyed in a physical uplink control channel (PUCCH) transmission via an interlace of resource blocks (RBs);
 determine a group of the RBs available to the UE; and
 transmit the payload bits using the determined group of the RBs, wherein the transmitting comprises modulating different RBs of the group of the RBs by different payload bits.

2. The apparatus of claim 1, wherein the payload bits comprise:
 at least two bits of uplink control information (UCI); or
 a scheduling request (SR) bit and at least one bit of UCI.

3. The apparatus of claim 1, wherein transmitting the payload bits further comprises:
 transmitting at least a first bit of the payload bits using a first set of the RBs and a first cyclic shift; and
 transmitting at least a second bit of the payload bits is sent using a second set of the RBs and a second cyclic shift.

4. The apparatus of claim 3, wherein
 the first and second cyclic shifts are selected from a set of cyclic shifts allocated to the UE to allow for multiplexing with other UEs using the same interlace of the RBs.

5. The apparatus of claim 3, wherein:
 the first bit is transmitted by repeating a same sequence in each RB in the first set of the RBs; and
 the second bit is transmitted by repeating a same sequence in each RB in the second set of the RBs.

6. The apparatus of claim 5, wherein the memory and the processor are further configured to apply at least one of phase ramping, phase rotation, or scrambling to each sequence repetition of the first and second sets of the RBs.

7. The apparatus of claim 3, wherein:
 the first bit it transmitted by using different root sequences across different RBs in the first set of the RBs; and
 the second bit it transmitted by using different root sequences across different RBs in the first set of the RBs.

8. The apparatus of claim 3, wherein:
 the at least a first bit comprises a first bit of uplink control information (UCI) and one scheduling request (SR) bit; and
 the at least a second bit comprises a second bit of UCI.

9. The apparatus of claim 8, wherein:
 a first subset of the first set of the RBs is used to transmit the first bit of UCI; and
 a second subset of the first set of the RBs is used to transmit the SR bit.

10. The apparatus of claim 9, wherein:
the SR bit is always sent as a same value; or
the SR bit is only sent when the SR is a given value, otherwise each RB in the second subset of the first set of the RBs is left blank.

11. The apparatus of claim 3, wherein the payload bits are transmitted across at least first and second symbols.

12. The apparatus of claim 11, wherein:
each symbol is used to transmit a different bit of uplink control information (UCI).

13. The apparatus of claim 11, wherein:
the first symbol carries a first bit of uplink control information (UCI) and a scheduling request (SR) bit; and
the first symbol carries a second bit of UCI.

14. The apparatus of claim 3, wherein at least one of the first set of the RBs or the second sets of the RBs includes RBs in the first and the second symbols.

15. The apparatus of claim 1, wherein:
the UE selects a cyclic shift to convey a combination of values of the payload bits; and
the cyclic shifts is selected from a set of cyclic shifts allocated to the UE to allow for multiplexing with other UEs using the same interlace of the RBs, wherein the cyclic shifts allocated to each UE are designed to reduce a probability of a missed detection or false detection of a first bit of the payload bits, caused by a timing error, when compared to another bit of the payload bits.

16. The apparatus of claim 1, wherein:
the determined group of the RBs available to the UE comprises a partial set of the RBs.

17. A method for wireless communications by a user equipment (UE), comprising:
obtaining payload bits to be conveyed in a physical uplink control channel (PUCCH) transmission via an interlace of resource blocks (RBs);
determining a group of the RBs available to the UE; and
transmitting the payload bits using the determined group of the RBs, wherein the transmitting comprises:
modulating different RBs of the group of the RBs by different payload bits.

18. The method of claim 17, wherein the payload bits comprise:
at least two bits of uplink control information (UCI); or
a scheduling request (SR) bit and at least one bit of UCI.

19. The method of claim 17, wherein transmitting the payload bits further comprises:
transmitting at least a first bit of the payload bits using a first set of the RBs and a first cyclic shift; and
transmitting at least a second bit of the payload bits is sent using a second set of the RBs and a second cyclic shift.

20. The method of claim 17, wherein the first and second cyclic shifts are selected from a set of cyclic shifts allocated to the UE to allow for multiplexing with other UEs using the same interlace of the RBs.

21. The method of claim 17, wherein:
the first bit is transmitted by repeating a same sequence in each RB in the first set of the RBs; and
the second bit is transmitted by repeating a same sequence in each RB in the second set of the RBs.

22. The method of claim 21, further comprising applying at least one of phase ramping, phase rotation, or scrambling to each sequence repetition of the first and second sets of the RBs.

23. The method of claim 17, wherein:
the first bit is transmitted by using different root sequences across different RBs in the first set of the RBs; and
the second bit is transmitted by using different root sequences across different RBs in the second set of the RBs.

24. The method of claim 17, wherein:
the at least a first bit comprises a first bit of uplink control information (UCI) and one scheduling request (SR) bit; and
the at least a second bit comprises a second bit of UCI.

25. The method of claim 24, wherein:
a first subset of the first set of the RBs is used to transmit the first bit of UCI; and
a second subset of the first set of the RBs is used to transmit the SR bit.

26. The method of claim 25, wherein:
the SR bit is always sent as a same value; or
the SR bit is only sent when the SR is a given value, otherwise each RB in the second subset of the first set of the RBs is left blank.

27. The method of claim 17, wherein transmitting the payload bits comprises transmitting the payload bits across at least first and second symbols.

28. The method of claim 27, wherein:
each symbol is used to transmit a different bit of uplink control information (UCI).

29. The method of claim 27, wherein:
the first symbol carries a first bit of uplink control information (UCI) and a scheduling request (SR) bit; and
the first symbol carries a second bit of UCI.

30. The method of claim 27, wherein at least one of the first set of the RBs or the second sets of the RBs includes RBs in the first and the second symbols.

31. The method of claim 17, further comprising selecting a cyclic shift to convey a combination of values of the payload bits, wherein:
the cyclic shifts is selected from a set of cyclic shifts allocated to the UE to allow for multiplexing with other UEs using the same interlace of the RBs, and
the cyclic shifts allocated to each UE are designed to reduce a probability of a missed detection or false detection of a first bit of the payload bits, caused by a timing error, when compared to another bit of the payload bits.

32. The method of claim 17, wherein:
the determined group of the RBs available to the UE comprises a partial set of the interlace of RBs.

33. An apparatus for wireless communications by a user equipment (UE), comprising:
means for obtaining payload bits to be conveyed in a physical uplink control channel (PUCCH) transmission via an interlace of resource blocks (RBs);
means for determining a group of the RBs available to the UE; and
means for transmitting the payload bits using the determined group of the RBs, wherein the means for transmitting comprises:
means for modulating different RBs of the group by different payload bits,
means for transmitting at least a first bit of the payload bits using a first set of RBs of the group of the RBs and a first cyclic shift; and
means for transmitting at least a second bit of the payload bits using a second set of RBs of the group of the RBs and a second cyclic shift.

34. A non-transitory computer-readable medium comprising computer-executable instructions that, when executed by a processor of a user equipment (UE), cause the UE to perform a method of wireless communications, comprising:
- obtaining payload bits to be conveyed in a physical uplink control channel (PUCCH) transmission via an interlace of resource blocks (RBs);
- determining a group of the RBs available to the UE; and
- transmitting the payload bits using the determined group of the RBs, wherein the transmitting comprises:
- modulating different RBs of the group by different payload bits,
- transmitting at least a first bit of the payload bits using a first set of RBs of the group of the RBs and a first cyclic shift; and
- transmitting at least a second bit of the payload bits using a second set of RBs of the group of the RBs and a second cyclic shift.

* * * * *